(12) United States Patent
Fu

(10) Patent No.: US 11,119,266 B2
(45) Date of Patent: Sep. 14, 2021

(54) DISPLAY MODULE AND DISPLAY DEVICE

(71) Applicant: HUIZHOU CHINA STAR OPTOELECTRONICS TECHNOLOGY CO., LTD., Huizhou (CN)

(72) Inventor: Linlin Fu, Huizhou (CN)

(73) Assignee: HUIZHOU CHINA STAR OPTOELECTRONICS TECHNOLOGY CO., LTD., Huizhou (CN)

(*) Notice: Subject to any disclaimer, the term of this patent is extended or adjusted under 35 U.S.C. 154(b) by 0 days.

(21) Appl. No.: 16/608,142

(22) PCT Filed: Aug. 22, 2019

(86) PCT No.: PCT/CN2019/102092
§ 371 (c)(1),
(2) Date: Oct. 24, 2019

(87) PCT Pub. No.: WO2020/244061
PCT Pub. Date: Dec. 10, 2020

(65) Prior Publication Data
US 2020/0386933 A1 Dec. 10, 2020

(30) Foreign Application Priority Data

Jun. 5, 2019 (CN) .......................... 201910484019.0

(51) Int. Cl.
F21V 7/04 (2006.01)
F21V 8/00 (2006.01)

(52) U.S. Cl.
CPC ............ *G02B 6/005* (2013.01); *G02B 6/0046* (2013.01)

(58) Field of Classification Search
CPC ........ G02B 6/00; G02B 6/0003; G02B 6/001; G02B 6/0073; G02B 6/0023;
(Continued)

(56) References Cited

U.S. PATENT DOCUMENTS

2008/0137004 A1 6/2008 Iwasaki et al.
2015/0117052 A1* 4/2015 Hsu ................... G02F 1/133615
362/606

(Continued)

FOREIGN PATENT DOCUMENTS

CN 101128696 A 2/2008
CN 203204189 U 9/2013
(Continued)

*Primary Examiner* — William J Carter
*Assistant Examiner* — Omar Rojas Cadima

(57) ABSTRACT

The present disclosure provides a display module and a display device including the same. The display module includes a backplate, an optical film, a quantum dot film, a phosphor layer, and a light source. The optical film is disposed on the backplate. The optical film has a light incident surface, a light emitting surface, and a first side surface. The first side surface is perpendicular to the backplate, and the light emitting surface is parallel to the backplate. The quantum dot film is disposed on the light emitting surface of the optical film. The phosphor layer is disposed on the first side surface of the optical film. The light incident surface of the optical film is located on the backplate in a light emission direction of the light source.

18 Claims, 3 Drawing Sheets

(58) Field of Classification Search
CPC .. G02B 6/0031; G02B 6/0055; G02B 6/0051; G02B 6/0025; G02B 6/0015; G02B 6/0035; G02B 30/23; G02B 5/206; F21V 13/14; F21V 7/30; F21V 9/45; F21V 9/38; F21V 5/10; F21V 7/26; F21V 9/32; G02F 1/133603; G02F 1/133614; G02F 1/133606; G02F 2202/046; G02F 2202/36; G02F 2202/108; G02F 1/01791; G02F 1/133615; H01L 2924/181; H01L 2924/12041; H01L 33/50; F21Y 2115/10; F21Y 2103/10; F21K 9/61

See application file for complete search history.

(56) References Cited

U.S. PATENT DOCUMENTS

| | | | |
|---|---|---|---|
| 2015/0168634 A1* | 6/2015 | Lu | G02B 6/0031 |
| | | | 362/606 |
| 2019/0131365 A1 | 5/2019 | Jung | |
| 2020/0074951 A1 | 3/2020 | Lu et al. | |

FOREIGN PATENT DOCUMENTS

| | | | |
|---|---|---|---|
| CN | 106597749 A | 4/2017 | |
| CN | 108648625 A | 10/2018 | |
| CN | 109064986 U | 12/2018 | |
| CN | 208224670 U | 12/2018 | |
| CN | 208297888 U | 12/2018 | |
| CN | 109728182 A | 5/2019 | |

* cited by examiner

DISPLAY MODULE AND DISPLAY DEVICE

FIELD OF INVENTION

The present disclosure relates to a field of display technology, and particularly to a display module and a display device.

BACKGROUND

In recent years, with development of technology, display devices such as televisions, laptop computers and personal digital assistants (PDAs) have gradually integrated into lives of users. Among them, televisions are necessary products for users to receive external information.

In related art of televisions, high color gamut televisions generally emit red, green, blue, and white lights by blue light emitting diodes (LEDs) and quantum dot films, wherein the white light is formed by mixing the red, green, and blue lights. However, edges of display modules in high color gamut televisions may have blue light leakage.

Therefore, the prior art has drawbacks and needs to be improved.

SUMMARY OF DISCLOSURE

The present disclosure provides a display module and a display device comprising the same, which can reduce blue light leakage at edge of the display module.

The present disclosure provides a display module, comprising:

a backplate;

an optical film disposed on the backplate, wherein the optical film has a light incident surface, a light emitting surface, and a first side surface, wherein the first side surface is perpendicular to the backplate, and the light emitting surface is parallel to the backplate;

a quantum dot film disposed on the light emitting surface of the optical film;

a phosphor layer disposed on the first side surface of the optical film; and a light source, wherein the light incident surface of the optical film is located on the backplate in a light emission direction of the light source.

In an embodiment, a vertical length of the phosphor layer is the same as a vertical length of the first side surface, and a horizontal length of the phosphor layer is the same as a horizontal length of the first side surface.

In an embodiment, the phosphor layer is composed of a phosphor powder or a phosphor glue.

In an embodiment, the light source is disposed on the backplate.

In an embodiment, the optical film is a light guide plate, and the light incident surface of the optical film is adjacent to the light emitting surface of the optical film and perpendicular to the backplate.

In an embodiment, the optical film further comprises a second side surface adjacent to the light incident surface and perpendicular to the backplate, and a third side surface opposite to the second side surface. The second side surface and the third side surface are provided with phosphor layers.

In an embodiment, a cross section of the optical film is shaped as a rectangle or a wedge.

In an embodiment, the display module further comprises a light guiding layer disposed between the phosphor layer and the optical film.

In an embodiment, the optical film is a diffusion plate, a light emission direction of the light source is perpendicular to the optical film, and the first side surface is parallel to the light emission direction of the light source.

The present disclosure further provides a display device. The display device comprises a housing and a display module disposed on the housing. The display module comprises:

a backplate;

an optical film disposed on the backplate, wherein the optical film has a light incident surface, a light emitting surface, and a first side surface, wherein the first side surface is perpendicular to the backplate, and the light emitting surface is parallel to the backplate;

a quantum dot film disposed on the light emitting surface of the optical film;

a phosphor layer disposed on the first side surface of the optical film; and a light source, wherein the light incident surface of the optical film is located on the backplate in a light emission direction of the light source.

In an embodiment, a vertical length of the phosphor layer is the same as a vertical length of the first side surface, and a horizontal length of the phosphor layer is the same as a horizontal length of the first side surface.

In an embodiment, the phosphor layer is composed of a phosphor powder or a phosphor glue.

In an embodiment, the light source is disposed on the backplate.

In an embodiment, the optical film is a light guide plate, and the light incident surface of the optical film is adjacent to the light emitting surface of the optical film and perpendicular to the backplate.

In an embodiment, the optical film further comprises a second side surface adjacent to the light incident surface and perpendicular to the backplate, and a third side surface opposite to the second side surface. The second side surface and the third side surface are provided with phosphor layers.

In an embodiment, a cross section of the optical film is shaped as a rectangle or a wedge.

In an embodiment, the display module further comprises a light guiding layer disposed between the phosphor layer and the optical film.

In an embodiment, the optical film is a diffusion plate, a light emission direction of the light source is perpendicular to the optical film, and the first side surface is parallel to the light emission direction of the light source.

The present disclosure further provides a display module, comprising:

a backplate;

an optical film disposed on the backplate, wherein the optical film has a light incident surface, a light emitting surface, and a first side surface, wherein the first side surface is perpendicular to the backplate, and the light emitting surface is parallel to the backplate;

a quantum dot film disposed on the light emitting surface of the optical film;

a phosphor layer disposed on the first side surface of the optical film, wherein a vertical length of the phosphor layer is the same as a vertical length of the first side surface, and a horizontal length of the phosphor layer is the same as a horizontal length of the first side surface; and a light source disposed on the backplate, wherein the light incident surface of the optical film is located on the backplate in a light emission direction of the light source.

In an embodiment, the phosphor layer is composed of a phosphor powder or a phosphor glue, the optical film is a diffusion plate, a light emission direction of the light source is perpendicular to the optical film, and the first side surface is parallel to the light emission direction of the light source.

The present disclosure provides a display module comprising a backplate, an optical film, a quantum dot film, a phosphor layer, and a light source. The optical film is disposed on the backplate. The optical film has a light incident surface, a light emitting surface, and a first side surface. The first side surface is perpendicular to the backplate, and the light emitting surface is parallel to the backplate. The quantum dot film is disposed on the light emitting surface of the optical film. The phosphor layer is disposed on the first side surface of the optical film. The light incident surface of the optical film is located on the backplate in a light emission direction of the light source. The blue light leaking from edge of the optical film is neutralized by the phosphor layer, thereby reducing the blue light leakage at the edge of the display module.

BRIEF DESCRIPTION OF DRAWINGS

In order to more clearly illustrate the technical solutions in the embodiments of the present disclosure, a brief description of accompanying drawings used in the description of the embodiments of the present disclosure will be given below. Obviously, the accompanying drawings in the following description are merely some embodiments of the present disclosure. For those skilled in the art, other drawings may be obtained from these accompanying drawings without creative labor.

DETAILED DESCRIPTION

Figure 1:
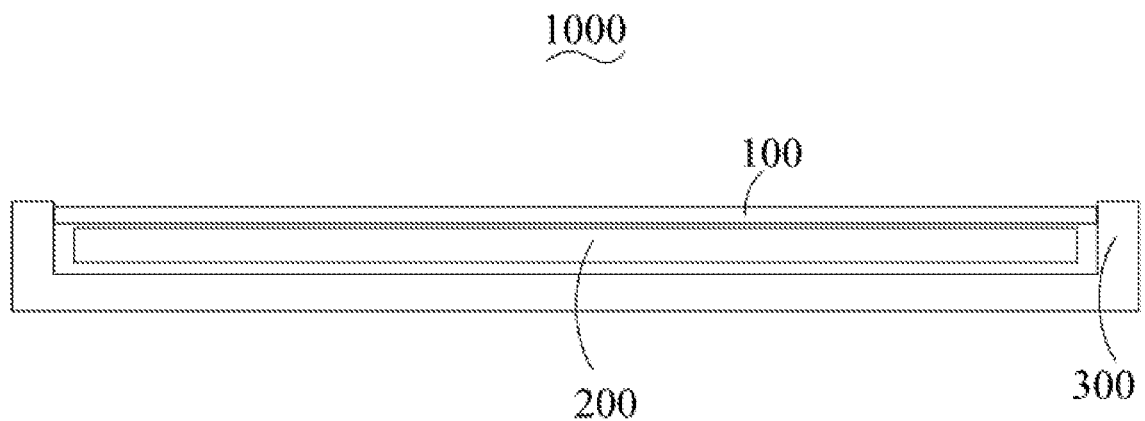
FIG. 1 is a schematic diagram of a display device according to an embodiment of the present disclosure.

The technical solutions in the embodiments of the present disclosure will be clearly and completely described below in conjunction with the accompanying drawings in the embodiments of the present disclosure. It is apparent that the described embodiments are merely a part of the embodiments of the present disclosure and not all embodiments. All other embodiments obtained by those skilled in the art based on the embodiments of the present disclosure without creative labor are within the claimed scope of the present disclosure.

In current art of televisions, high color gamut televisions generally emit red, green, blue, and white lights by blue light emitting diodes (LEDs) and quantum dot films, wherein the white light is formed by mixing the red, green, and blue lights. However, edges of display modules in high color gamut televisions may have blue light leakage.

Whether it is a direct-lit display module or a edge-lit display module, blue light leakage occurs at the edge. The main reasons are that (1) quantum dots at edge of a quantum dot film cannot be excited and malfunction, causing blue light emitted by LEDs directly exits from the quantum dot film; and (2) the LEDs emit Lambertian light, and most of the light is directly incident into a light guide plate or a diffusion plate, and the other part of the light is diffusely reflected by sidewalls of a housing and then exits from an optical film. Because color difference between blue light and white light is large, it is easy to distinguish and recognize blue light and white light.

The present disclosure further provides a display device. The display device comprises a housing and a display module disposed on the housing. The display module comprises:

a backplate;

an optical film disposed on the backplate, wherein the optical film has a light incident surface, a light emitting surface, and a first side surface, wherein the first side surface is perpendicular to the backplate, and the light emitting surface is parallel to the backplate;

a quantum dot film disposed on the light emitting surface of the optical film;

a phosphor layer disposed on the first side surface of the optical film; and a light source, wherein the light incident surface of the optical film is located on the backplate in a light emission direction of the light source.

In an embodiment, a vertical length of the phosphor layer is the same as a vertical length of the first side surface, and a horizontal length of the phosphor layer is the same as a horizontal length of the first side surface.

In an embodiment, the phosphor layer is composed of a phosphor powder or a phosphor glue.

In an embodiment, the light source is disposed on the backplate.

In an embodiment, the optical film is a light guide plate, and the light incident surface of the optical film is adjacent to the light emitting surface of the optical film and perpendicular to the backplate.

In an embodiment, the optical film further comprises a second side surface adjacent to the light incident surface and perpendicular to the backplate, and a third side surface opposite the second side surface. The second side surface and the third side surface are provided with phosphor layers.

In an embodiment, a cross section of the optical film is shaped as a rectangle or a wedge.

In an embodiment, the display module further comprises a light guiding layer disposed between the phosphor layer and the optical film.

In an embodiment, the optical film is a diffusion plate, a light emission direction of the light source is perpendicular to the optical film, and the first side surface is parallel to the light emission direction of the light source.

Please refer to FIG. 1, which is a schematic diagram of a display device 1000 according to an embodiment of the present disclosure. The display device 1000 may comprise a display module 100, a control circuit 200, and a housing 300. It should be noted that the display device 1000 shown in FIG. 1 may further comprise other components such as a camera, an antenna structure, and a fingerprint unlocking module.

The display module 100 is disposed on the housing 300.

In an embodiment, the display module 100 is fixed to the housing 300, and the display module 100 and the housing 300 form an enclosed space to accommodate components such as the control circuit 200.

In an embodiment, the housing 300 may be made of a flexible material such as plastic or silicone. The housing 300 covers two sides of the display module 100 so that light emitted by the display module 100 does not leak outside.

The control circuit 200 is disposed in the housing 300. The control circuit 200 may be a main board of the display device 1000. The control circuit 200 may be integrated with one or more functional components such as a battery, an antenna structure, a microphone, a speaker, a headphone interface, a universal serial bus interface, a camera, a distance sensor, an ambient light sensor, a receiver, and a processor.

The display module 100 is disposed in the housing 300 and is electrically connected to the control circuit 200 to form a display surface of the display device 1000. The display module 100 may comprise a display area and a non-display area. The display area can be used to display an image of the display device 1000 or for a user to perform touch manipulation or the like. The non-display area can be used for disposing various functional components.

Figure 2:
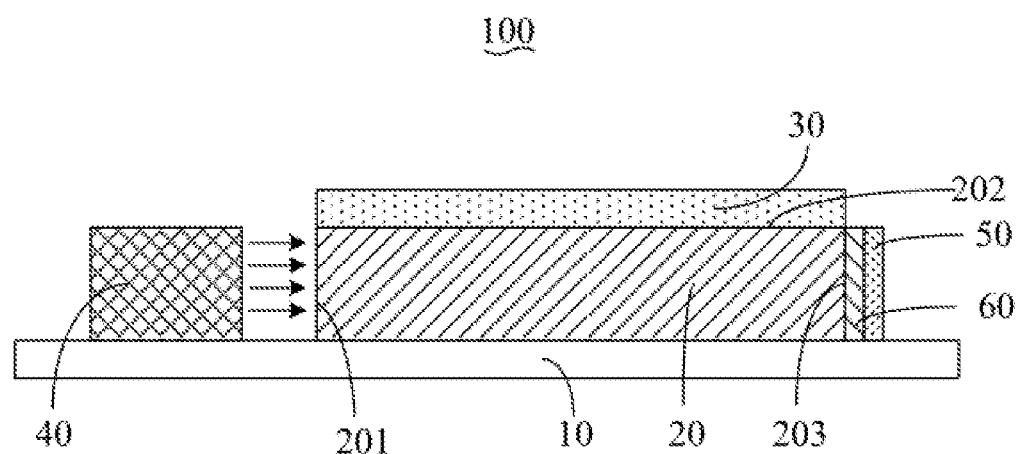
FIG. 2 is a schematic diagram of a first type of a display module according to an embodiment of the present disclosure.

Please refer to FIG. 2, which is a schematic diagram of first type of a display module 100 according to an embodiment of the present disclosure. The display module 100 comprises:

a backplate 10;

an optical film 20 disposed on the backplate 10, wherein the optical film 20 has a light incident surface 201, a light emitting surface 202, and a first side surface 203, wherein the first side surface 203 is perpendicular to the backplate 10, and the light emitting surface 202 is parallel to the backplate 10;

a quantum dot film 30 disposed on the light emitting surface 202 of the optical film 20;

a phosphor layer 50 disposed on the first side surface 203 of the optical film 20; and a light source 40, wherein the light incident surface 201 of the optical film 20 is located on the backplate 10 in a light emission direction of the light source 40.

Specifically, as shown in FIG. 2, the optical film 20 has a light incident surface 201, a light emitting surface 202 perpendicular to the light incident surface 201, and a first side surface 203 disposed opposite the light incident surface 201. Light emitted by the light source 40 is incident into the optical film 20 through the light incident surface 201, and the light is guided by the optical film 20 to the light emitting surface 202. However, part of the light exits from the first side surface 203 and exits from the quantum dot film 30 via reflection or diffuse reflection of sidewalls of the housing 300.

In an embodiment, the optical film 20 is a light guide plate, and the light incident surface 201 of the optical film 20 is adjacent to the light emitting surface of the optical film and perpendicular to the backplate 10. Specifically, this is a structure of a edge-lit backlight module.

In an embodiment, the light source 40 is generally blue LEDs, which may be disposed on the backplate 10 or may be disposed above or below the light incident surface 201, which is not limited herein. The quantum dot film 30 is generally a quantum dot film (QD film) matched with blue LEDs and is configured to be excited by blue light emitted by the blue LEDs. The blue light is incident into the quantum dot film 30 through the optical film 20 to generate red light, green light, and blue light, and these three lights are mixed to form white light.

In an embodiment, the display module 100 further comprises a light guiding layer 60 disposed between the phosphor layer 50 and the optical film 20.

It can be understood that the light guiding layer 60 is configured to guide light. After being reflected or diffusely reflected by sidewalls of the housing 300, the blue light is incident into the light guiding layer 60. Then, the light guiding layer 60 reflects or refracts the blue light to the quantum dot film 30.

In an embodiment, the phosphor layer 50 is composed of a phosphor powder or a phosphor glue.

Specifically, there are two ways of forming the phosphor layer 50. If the phosphor layer 50 is composed of a phosphor powder, the first side surface 203 of the optical film 20 may be coated with a light guiding layer 60, dried, and then coated with a phosphor powder. If the phosphor layer 50 is composed of a phosphor glue, the first side surface 203 of the optical film 20 may be coated with a light guiding layer 60, then dried, and then coated with a phosphor glue. Specifically, the phosphor layer 50 may be yellow. When the blue light is reflected or diffusely reflected by the sidewalls of the housing 300 to the phosphor layer 50, the blue light excites the phosphor layer 50 to generate yellow light. The yellow light mixes with the blue light to form white light. This reduces blue light leakage at the edge of the quantum dot film 30.

Figure 3:
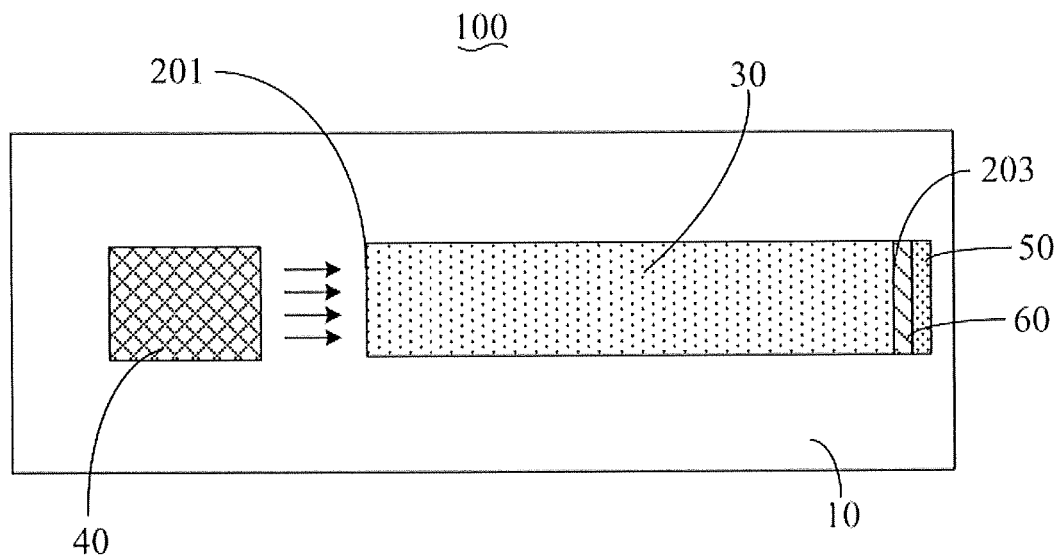
FIG. 3 is a schematic diagram of a second type of a display module according to an embodiment of the present disclosure.

Please refer to FIG. 3, which is a schematic diagram of a second type of a display module 100 according to an embodiment of the present disclosure, and is also a top view of FIG. 2. In an embodiment, as shown in FIG. 3, a vertical length of the phosphor layer 50 is the same as a vertical length of the first side surface 203, and a horizontal length of the phosphor layer 50 is the same as a horizontal length of the first side surface 203.

It can be understood that in order to make the blue light leaking from the edge of the optical film 20 completely neutralized by the phosphor layer 50, it is necessary to keep the vertical length of the phosphor layer 50 the same as the vertical length of the first side surface 203, and the horizontal length of the phosphor layer 50 the same as the horizontal length of the first side surface 203, and details are not described herein.

Figure 4:
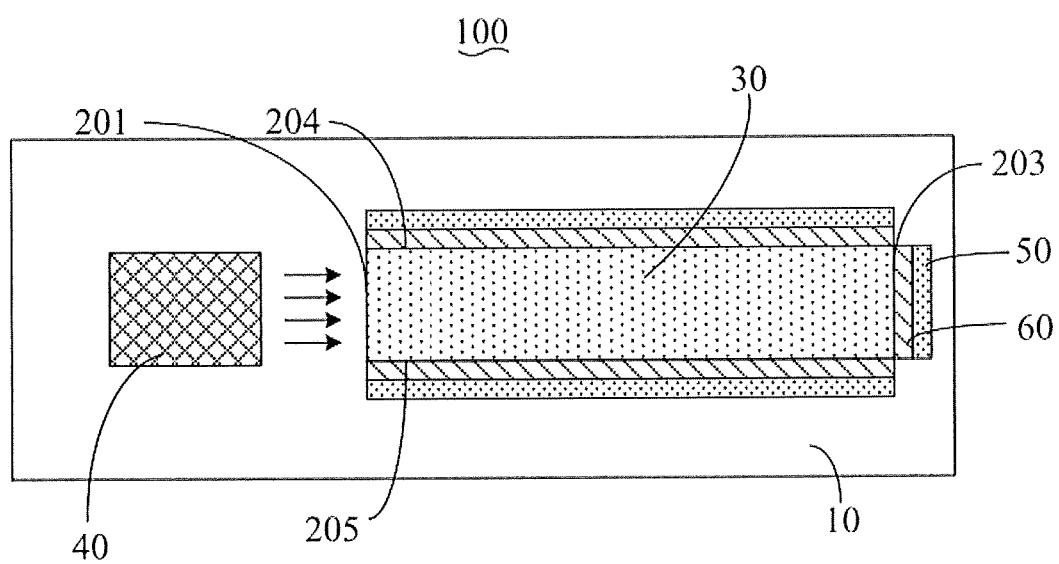
FIG. 4 is a schematic diagram of a third type of a display module according to an embodiment of the present disclosure.

Please refer to FIG. 4, which is a schematic diagram of a third type of a display module 100 according to an embodiment of the present disclosure. In an embodiment, as shown in FIG. 4, the optical film 20 further comprises a second side surface 204 adjacent to the light incident surface 201 and perpendicular to the backplate 10, and a third side surface 205 opposite the second side surface 204. The second side surface 204 and the third side surface 205 are provided with phosphor layers 50.

It can be understood that when the light emitted by the light source 40 passes through the optical film 20, it not only leaks from the first side surface 203 but also leaks from the second side surface 204 and the third side surface 205. The principle of disposing the phosphor layers 50 on the second side surface 204 and the third side surface 205 is the same as the principle of providing the phosphor layer 50 on the first side surface 203, and details are not described herein again. A light guiding layer 60 is also disposed between the second side surface 204 and the phosphor layer 50, and a light guiding layer 60 is also disposed between the third side surface 205 and the phosphor layer 50.

Figure 5:
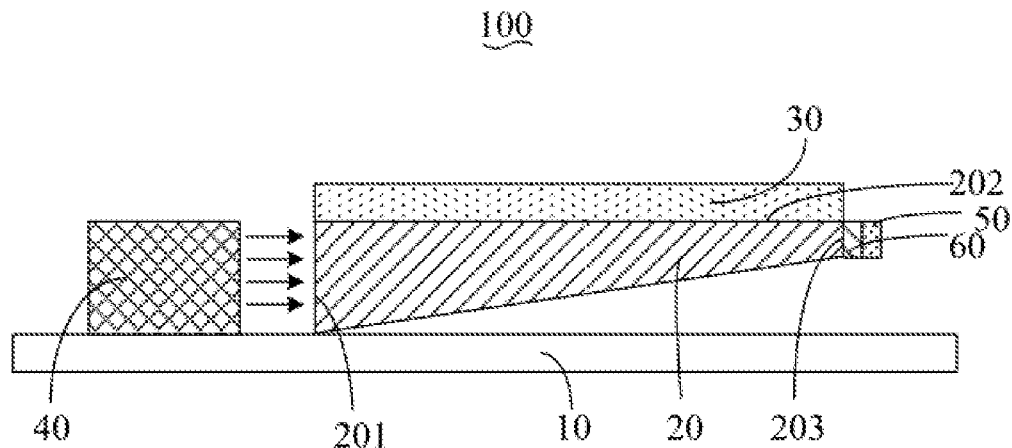
FIG. 5 is a schematic diagram of a fourth type of a display module according to an embodiment of the present disclosure.

Please refer to FIG. 5, which is a schematic diagram of a fourth type of a display module 100 according to an embodiment of the present disclosure. In an embodiment, as shown in FIG. 5, a cross section of the optical film is shaped as a rectangle or a wedge. It can be understood that a light guiding plate of an edge-lit display module is generally shaped as a rectangle or a wedge. The phosphor layer 50 is shaped as the shape of the first side surface 203 of the optical film 20.

Figure 6:
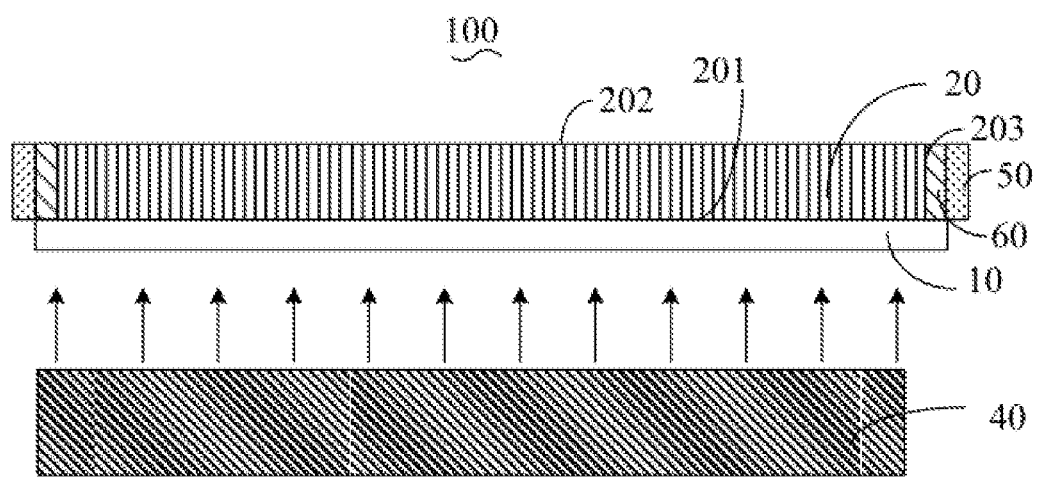
FIG. 6 is a schematic diagram of a fifth type of a display module according to an embodiment of the present disclosure.

Please refer to FIG. 6, which is a schematic diagram of a fifth type of a display module 100 according to an embodiment of the present disclosure. In an embodiment, as shown in FIG. 6, the optical film 20 is a diffusion plate, a light emission direction of the light source 40 is perpendicular to the optical film 20, and the first side surface 203 is parallel to the light emission direction of the light source 40.

It can be understood that the display module 100 of FIG. 6 is a direct-lit display module, characterized by the light source 40 disposed under the optical film 20. Therefore, the phosphor layer 50 may be disposed on the first side surface 203 of the optical film 20 or on the light guiding layer 60 disposed on the first side surface 203, and its function is the same as the phosphor layer 50 of the edge-lit display module, and details are not described herein again.

The present disclosure provides a display module 100 comprising a backplate 10, an optical film 20, a quantum dot film 30, a light source 40, and a phosphor layer 50. The optical film 20 is disposed on the backplate 10. The optical film 20 has a light incident surface 201, a light emitting surface 202, and a first side surface 203. The first side surface 203 is perpendicular to the backplate 10, and the light emitting surface 202 is parallel to the backplate 10. The quantum dot film 30 is disposed on the light emitting surface 202 of the optical film 20. The phosphor layer 50 is disposed on the first side surface 203 of the optical film 20. The light incident surface 201 of the optical film 20 is located on the backplate 10 in a light emission direction of the light source 40. The blue light leaking from edge of the optical film 20 is neutralized by the phosphor layer 50, thereby reducing the blue light leakage at the edge of the display module 100.

The present disclosure further provides a display module, comprising:
a backplate;
an optical film disposed on the backplate, wherein the optical film has a light incident surface, a light emitting surface, and a first side surface, wherein the first side surface is perpendicular to the backplate, and the light emitting surface is parallel to the backplate;
a quantum dot film disposed on the light emitting surface of the optical film;
a phosphor layer disposed on the first side surface of the optical film, wherein a vertical length of the phosphor layer is the same as a vertical length of the first side surface, and a horizontal length of the phosphor layer is the same as a horizontal length of the first side surface; and
a light source disposed on the backplate, wherein the light incident surface of the optical film is located on the backplate in a light emission direction of the light source.

In an embodiment, the phosphor layer is composed of a phosphor powder or a phosphor glue, the optical film is a diffusion plate, a light emission direction of the light source is perpendicular to the optical film, and the first side surface is parallel to the light emission direction of the light source.

The display module and the display device provided by the embodiment of the present disclosure is described in detail above. The principle and implementation method of the present application are described herein by way of specific embodiments. The above description of the embodiments is only for helping to understand the technical solutions of the present disclosure and its core ideas. It should be understood by those skilled in the art that they can still modify the technical solutions recited in the foregoing embodiments, and these modifications or substitutions do not depart from the scope of the technical solutions of the embodiments of the present disclosure.

What is claimed is:

1. A display module, comprising:
a backplate;
an optical film disposed on the backplate, wherein the optical film comprises a light incident surface, a light emitting surface, and a first side surface, wherein the first side surface is perpendicular to the backplate, and the light emitting surface is parallel to the backplate;
a quantum dot film disposed on the light emitting surface of the optical film;
a light source configured to emit blue light, wherein the light incident surface of the optical film is located on the backplate in a light emission direction of the light source;
a yellow phosphor layer disposed on the first side surface of the optical film and configured to be excited by a part of the blue light reflected or diffusely reflected to the yellow phosphor layer to generate yellow light, wherein the yellow light mixes with the blue light to form white light; and
a light guiding layer disposed between the yellow phosphor layer and the optical film and configured to guide a part of the blue light reflected or diffusely reflected to the light guiding layer into the quantum dot film.

2. The display module according to claim 1, wherein a vertical length of the yellow phosphor layer is the same as a vertical length of the first side surface, and a horizontal length of the yellow phosphor layer is the same as a horizontal length of the first side surface.

3. The display module according to claim 2, wherein the yellow phosphor layer is composed of a phosphor powder or a phosphor glue.

4. The display module according to claim 1, wherein the light source is disposed on the backplate.

5. The display module according to claim 1, wherein the optical film is a light guide plate, and the light incident surface of the optical film is adjacent to the light emitting surface of the optical film and perpendicular to the backplate.

6. The display module according to claim 5, wherein the optical film further comprises a second side surface adjacent to the light incident surface and perpendicular to the backplate, and a third side surface opposite the second side surface, and the second side surface and the third side surface are provided with phosphor layers that are same as the yellow phosphor layer.

7. The display module according to claim 5, wherein a cross section of the optical film is shaped as a rectangle or a wedge.

8. The display module according to claim 1, wherein the optical film is a diffusion plate, a light emission direction of the light source is perpendicular to the optical film, and the first side surface is parallel to the light emission direction of the light source.

9. A display device, comprising:
a housing; and
a display module disposed on the housing, comprising:
a backplate;
an optical film disposed on the backplate, wherein the optical film has a light incident surface, a light emitting surface, and a first side surface, wherein the first side surface is perpendicular to the backplate, and the light emitting surface is parallel to the backplate;
a quantum dot film disposed on the light emitting surface of the optical film;
a light source configured to emit blue light, wherein the light incident surface of the optical film is located on the backplate in a light emission direction of the light source;
a yellow phosphor layer disposed on the first side surface of the optical film and configured to be excited by a part of the blue light reflected or diffusely reflected to the yellow phosphor layer to generate yellow light, wherein the yellow light mixes with the blue light to form white light; and
a light guiding layer disposed between the yellow phosphor layer and the optical film and configured to guide a part of the blue light reflected or diffusely reflected to the light guiding layer into the quantum dot film.

10. The display device according to claim 9, wherein a vertical length of the yellow phosphor layer is the same as a vertical length of the first side surface, and a horizontal length of the yellow phosphor layer is the same as a horizontal length of the first side surface.

11. The display device according to claim 10, wherein the yellow phosphor layer is composed of a phosphor powder or a phosphor glue.

12. The display device according to claim 9, wherein the light source is disposed on the backplate.

13. The display device according to claim 9, wherein the optical film is a light guide plate, and the light incident surface of the optical film is adjacent to the light emitting surface of the optical film and perpendicular to the backplate.

14. The display device according to claim 13, wherein the optical film further comprises a second side surface adjacent to the light incident surface and perpendicular to the backplate, and a third side surface opposite to the second side surface, and the second side surface and the third side surface are provided with phosphor layers that are same as the yellow phosphor layer.

15. The display device according to claim 13, wherein a cross section of the optical film is shaped as a rectangle or a wedge.

16. The display device according to claim 9, wherein the optical film is a diffusion plate, a light emission direction of the light source is perpendicular to the optical film, and the first side surface is parallel to the light emission direction of the light source.

17. A display module, comprising:
a backplate;
an optical film disposed on the backplate, wherein the optical film has a light incident surface, a light emitting surface, and a first side surface, wherein the first side surface is perpendicular to the backplate, and the light emitting surface is parallel to the backplate;
a quantum dot film disposed on the light emitting surface of the optical film;
a light source disposed on the backplate and configured to emit blue light, wherein the light incident surface of the optical film is located on the backplate in a light emission direction of the light source;
a yellow phosphor layer disposed on the first side surface of the optical film and configured to be excited by a part of the blue light reflected or diffusely reflected to the yellow phosphor layer to generate yellow light, wherein the yellow light mixes with the blue light to form white light, a vertical length of the yellow phosphor layer is the same as a vertical length of the first side surface, and a horizontal length of the yellow phosphor layer is the same as a horizontal length of the first side surface; and
a light guiding layer disposed between the yellow phosphor layer and the optical film and configured to guide a part of the blue light reflected or diffusely reflected to the light guiding layer into the quantum dot film.

18. The display module according to claim 17, wherein the yellow phosphor layer is composed of a phosphor powder or a phosphor glue, the optical film is a diffusion plate, a light emission direction of the light source is perpendicular to the optical film, and the first side surface is parallel to the light emission direction of the light source.

* * * * *